(12) United States Patent  
Jeschke

(10) Patent No.: US 7,716,635 B1  
(45) Date of Patent: May 11, 2010

(54) METHOD FOR THE GENERATION OF GRAPHIC USER INTERFACES FOR COMPUTER PROGRAMS

(76) Inventor: Roland Jeschke, Naheweinstrasse 3, 55444 Schweppenhausen (DE)

( * ) Notice: Subject to any disclaimer, the term of this patent is extended or adjusted under 35 U.S.C. 154(b) by 868 days.

(21) Appl. No.: 10/148,532

(22) PCT Filed: Nov. 28, 2000

(86) PCT No.: PCT/DE00/04233

§ 371 (c)(1),  
(2), (4) Date: Oct. 1, 2002

(87) PCT Pub. No.: WO01/40930

PCT Pub. Date: Jun. 7, 2001

(30) Foreign Application Priority Data

Dec. 1, 1999 (DE) .................................. 199 57 883

(51) Int. Cl.  
*G06F 9/44* (2006.01)  
*G06F 17/30* (2006.01)  
*G06F 3/00* (2006.01)  
*G06F 3/048* (2006.01)

(52) U.S. Cl. ...................... 717/109; 715/762; 715/763; 707/3; 707/1; 717/106

(58) Field of Classification Search .................. 717/109  
See application file for complete search history.

(56) References Cited

U.S. PATENT DOCUMENTS

| | | | | |
|---|---|---|---|---|
| 5,450,545 | A * | 9/1995 | Martin et al. | 717/109 |
| 5,509,116 | A | 4/1996 | Hiraga et al. | |
| 5,892,510 | A | 4/1999 | Lau et al. | |
| 5,950,190 | A * | 9/1999 | Yeager et al. | 707/3 |
| 6,330,007 | B1 * | 12/2001 | Isreal et al. | 715/762 |
| 6,668,354 | B1 * | 12/2003 | Chen et al. | 715/517 |
| 2002/0035616 | A1 * | 3/2002 | Diamond et al. | 709/219 |
| 2002/0049700 | A1 * | 4/2002 | Couch et al. | 707/1 |

* cited by examiner

*Primary Examiner*—Insun Kang  
(74) *Attorney, Agent, or Firm*—Jones Walker

(57) ABSTRACT

Method for the generation of Graphical User Interfaces for computer programs which are completely generated on the basis of rules stored in a data base. The method comprises defining a set of lists representing the display elements and the contents thereof, and defining an hierarchical order, and associating the entries in a list of the set of lists with other lists of the set of lists and such is representing the being contained of display elements within an other. The method further includes defining a relationship between the entries in the lists of the set of lists which is defining which particular display element is depending from the contents of which other superior display element.

2 Claims, 3 Drawing Sheets

Data Model "Data"

Data Model "Rules"

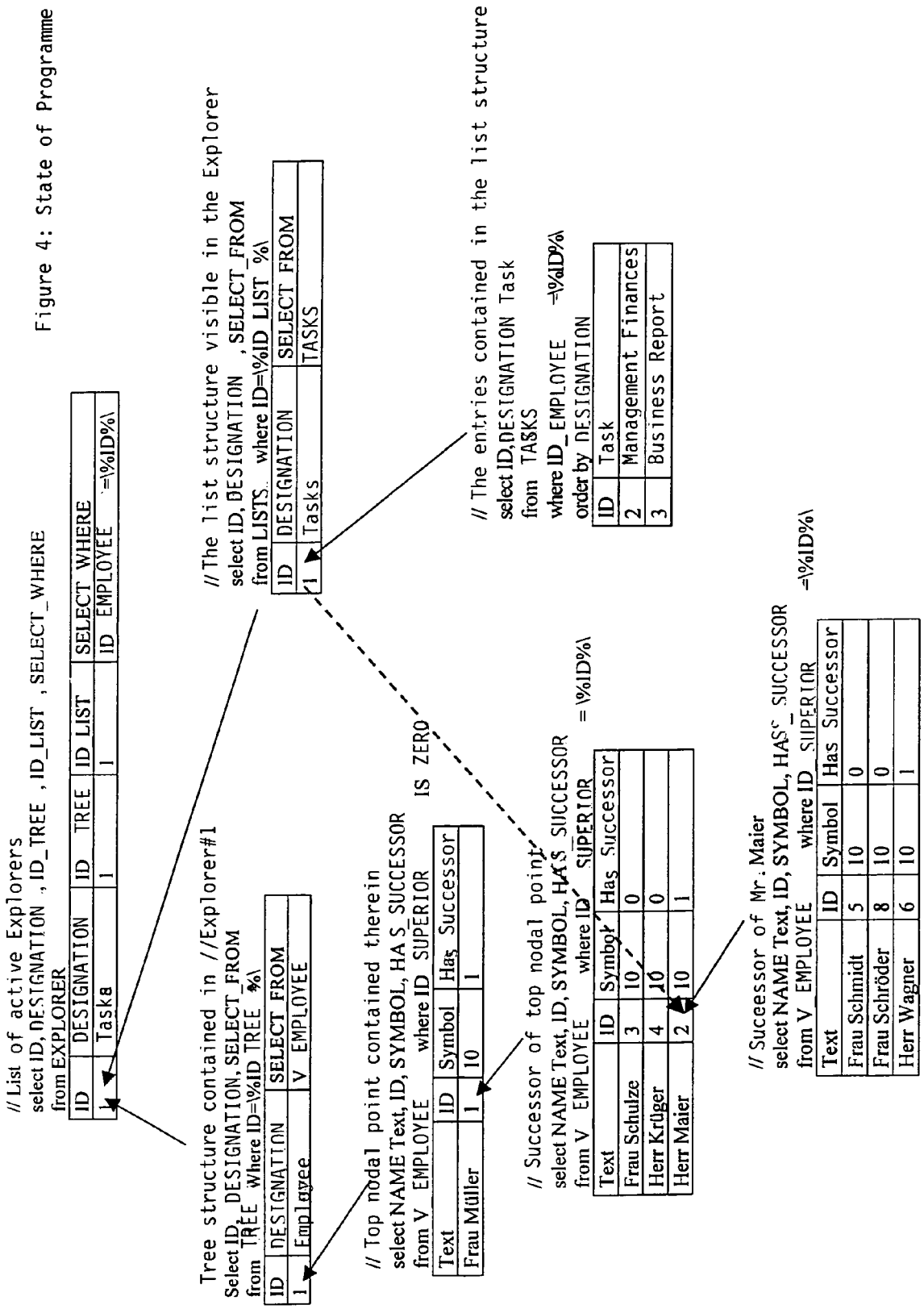
Figure 4: State of Programme

METHOD FOR THE GENERATION OF GRAPHIC USER INTERFACES FOR COMPUTER PROGRAMS

The present invention relates to a method for the generation of Graphical User Interfaces for computer programs.

The generation of such Graphical User Interfaces is getting more and more important, since increasingly with all applications such graphical surfaces are expected by the users.

Until now the programming of such Graphical User Interfaces was very laboursome and time consuming.

The closest prior art with respect to generation of Graphical User Interfaces for computer programs is formed by the U.S. Pat. No. 5,509,116. This publication discloses a system for managing Graphical User Interfaces. This as a important constituent is demanding an "Application Logic Enabler" (ALE) which is consisting of a set of application programs which are providing their functionality by means of an own User Interface. Main function of this method according to the prior art is, to record interactions of the user with these application programs on the level of the operating system, to manage these recordings and to combine them to stories, link them with a new graphic User Interface and play them back again depending from a User Input (Event Playback Section). In this way according to the mentioned prior art existing application programs are encapsuled by a Graphical User Interface. This method according to the prior art, too, is using a relational database model to store the rules according to which the Graphical User Interface is to be built and to be interpreted.

A further prior art with respect to the generation of Graphical User Interfaces can be found in U.S. Pat. No. 5,892,510. This reference is disclosing field objects and a method for generating a Graphical User Interface, which is containing these field objects. In this connection a method is disclosed serving to generate object oriented sourcecoding which after translation and binding can be performed as a program. In connection therewith display elements of the Graphical User Interface are associated with columns of database tables, too.

Starting out from this prior art it is the task to be solved by the present invention to enable a Graphical User Interfaces and its relation to the data managed thereby and their functions only by entries in tables such, that the generation of such a Graphical User Interface basically can be automatized and simultaneously is simplified and accelerated.

According to the invention, this task is solved by the feature that a method for the generation of Graphical User Interfaces for computer programs is disclosed, in which the Graphical User Interfaces completely are generated on the basis of rules stored in a database and each program state of the Graphical User Interface is defined by a set of lists representing the display elements and the contents thereof, a hierarchic order associating the entries in one list from the set of list with other lists from the set of lists and thereby representing the "being contained" of display elements within each other and a relationship between the entries in the lists of the set of lists which defines which display element is depending from the contents of which other superior display element.

Advantages improvements of the invention are disclosed in the subclaims.

The present invention is more detailly described with reference to the exemplary embodiment disclosed below, which is shown in the drawings. In the drawings show:

FIG. 1 as an example a program surface (display on the monitor) created by the method according to the invention;

FIG. 2 a data model according to the invention for the data of the exemplary program surface;

FIG. 3 a data model according to the invention for the rules of the exemplary program surface and FIG. 4 the program states according to the invention of the exemplary program surface.

The method according to the invention enables the complete generation of graphical program surfaces on the basis of rules stored in a database. Preferably it is applicable if the data to be processed are stored in the database and if the processing functionality of the desired application, too, is stored in the database (in an ORACLE-database for example this would be achieved by tables, table contents, constraints, functions, stored procedures and packages). This method therefore, is especially suitable for the generation of classic Client-Server-Client-Systems.

Basis of the method according to the invention is the approach to completely load the program surface with all display elements contained on the basis of rules from control tables of the database. The structure and the contents of these tables define how a program surface has to look and what input it is processing. An algorithm co-ordinated with the structure of the control tables which apart from that is generally valid, is evaluating the rules, generates the desired display elements on the Client, interprets the User Inputs and is passing these on to the database system for execution. According to this method, all usual display elements of a program like program windows, command menus, tables, tree structures and dialogues can be generated and filled with data.

The structure of the control tables and the algorithm interpreting their contents are generally valid in so far as they are not tailored to a certain data model or certain functionality but instead enable an entire class of program surfaces on deliberate data models with deliberate functionalities. To generate the desired program, the designer of the application only has to program the processing functionality on the server. For the generation of the program surface it is sufficient to insert the data in the control tables. The complexity of program surfaces achievable in this way is only limited by the complexity of the set of rules which the algorithm is interpreting.

The method according to the invention on the basis of an example will be explained for an "Explorer". The explorer in the example has the designation "tasks" and is containing as control elements a tree structure and a list as shown in FIG. 1.

The explorer is to built the tree structure on the basis of the hierarchy of the employees and in any case if in the tree structure a nodal point is activated (e.g. by clicking) the list structure is filled with the tasks of the respective employee.

The contents of tree and list structures according to these rules are loaded from data tables. For our example we are starting out from two tables:

The Table of the Employees:

| ID | Name | ID_SUPERIOR |
|---|---|---|
| 1 | Frau Müller | |
| 2 | Herr Maier | 1 |
| 3 | Frau Schulze | 1 |
| 4 | Herr Krüger | 1 |
| 5 | Frau Schmidt | 2 |
| 6 | Herr Wagner | 2 |
| 7 | Herr Bäcker | 6 |
| 8 | Frau Schröder | 2 |

Each entry is representing an employee, identified by an unequivocal number represented by the name and placed in the hierarchy by the unequivocal number of the superior.

The Table of the Task:

| ID | DESIGNATION | ID_EMPLOYEE |
|----|-------------|-------------|
| 1  | Management | 1 |
| 2  | Management Finances | 2 |
| 3  | Business report | 2 |
| 4  | Bookkeeping | 5 |
| 5  | Accounting | 5 |
| 6  | Monthly Statement of Account | 6 |
| 7  | Annual Statement of Account | 6 |
| 8  | Turnover tax declaration | 5 |
| 9  | Staff accounting | 8 |
| 10 | Management Application development | 3 |
| 11 | Sale | 3 |
| 12 | Marketing | 3 |
| 13 | Projecting | 4 |
| 14 | Project planning | 4 |
| 15 | Offering | 4 |
| 16 | Data recording | 7 |

Each set of data is representing the tasks of an employee, identified by an unequivocal number, represented by a designation associated with the employee by the unequivocal number thereof.

The display elements possible in a program surface according to the invention are defined by rules which are stored in tables. Such for example the tree and list structures used in a program can be inserted in tables.

Table of the Tree Structures

| ID | DESIGNATION | NOTE |
|----|-------------|------|
| 1  | Employees | Builds the structure of employees |

Table of the List Structures

| ID | DESIGNATION | NOTE | SELECT_FROM |
|----|-------------|------|-------------|
| 1  | Tasks | Builds tasks list | PERSONAL.TASKS |

The "Explorer" provided for the program could be represented by entries in a further table:

Table of the "Explorer":

| ID | DESIGNATION | ID_TREE | ID_LIST | SELECT WHERE |
|----|-------------|---------|---------|--------------|
| 1  | Tasks | 1 | 1 | ID_EMPLOYEES = \%ID%\ |

By the structure and the contents of the rule-tables and by the contents of the "data tables" a hierarchy of the display elements is defined: Each display element places itself in the hierarchy of all objects and it is together with further objects associated to a superior object. Followingly the tree and list structure is subordinated always to that object which is representing the Explorer as an entity. Additionally within a tree structure each nodal point is taking a place in the hierarchy of the tree. Only the object of the application does not have a superior object it is superior to all other objects.

Apart from the hierarchy being valid for the object, by the rules it is defined which properties an object has. In the example each nodal point in the tree has the properties "name", "number", "symbol", and "hasSuccesors".

If the "Explorer" defined thereby is started, on the basis of the rules objects are generated, which are describing the concrete shape of the Explorer and of all display elements contained therein. The visual representation is the Explorer filled with data as a constituent of the program surface, the objects belonging thereto internally are represented as entries in lists. Followingly the Explorer in the state shown in FIG. 1 is corresponding to the following lists:

Aktive Explorer:

| ID | DESIGNATION | ID_TREE | ID_LIST | SELECT_WHERE |
|----|-------------|---------|---------|--------------|
| 1  | Tasks | 1 | 1 | ID_EMPLOYEES=\%ID%\ |

Tree Structure Contained Therein:

| ID | DESIGNATION |
|----|-------------|
| 1  | Employee |

Top Nodal Point Contained Therein:

| Text | ID | Symbol | HatSuccessor |
|------|----|----|----|
| Frau Müller | 1 | 10 | 1 |

The Successor Thereof:

| Text | ID | Symbol | HatSuccessor |
|------|----|----|----|
| Frau Schulze | 3 | 10 | 0 |
| Herr Krüger | 4 | 10 | 0 |
| Herr Maier | 2 | 10 | 1 |

Successor of Hr. Maier:

| Text | ID | Symbol | HatSuccessor |
|------|----|----|----|
| Frau Schmidt | 5 | 10 | 0 |
| Frau Schröder | 8 | 10 | 0 |
| Herr Wagner | 6 | 10 | 1 |

The List Structure Visible in the Explorer:

| Text | ID | Symbol | HatSuccessor |
|------|----|----|----|
| Frau Schulze | 3 | 10 | 0 |
| Herr Krüger | 4 | 10 | 0 |
| Herr Maier | 2 | 10 | 1 |

The Entries Contained in the List Structure:

| ID | DESIGNATION |
|---|---|
| 2 | Management Finances |
| 3 | Business report |

Apart from the contents of the lists, the algorithm has to manage the hierarchic order of the lists among another.

To generate the subordinated objects of an display element and to display the same it is sufficient to interrogate the database contents defined by the rules to form lists of these and to show these by generally valid programmed algorithms. To e.g. open the nodal point of a tree, it has to be defined how the lists of the subordinated nodal points can be interrogated from the database, for example by the following tables:

Type of Nodal Points:

| ID | DESIGNATION | ID_SUCCESSOR | SELECT_FROM | SELECT_WHERE | SELECT_ORDER |
|---|---|---|---|---|---|
| 1 | Invisible root | 2 | STAFF.V_EMPLOYEE | ID_SUPERIOR IS ZERO | NAME |
| 2 | Employee | 2 | STAFF.V_EMPLOYEE | ID_SUPERIOR = \%ID\ | NAME |

Properties of Nodal Points:

| ID_NODALTYPE | DESIGNATION | FIELD NAME |
|---|---|---|
| 1 | Text | NAME |
| 2 | ID | ID |
| 2 | HasSuccessor | HAS-SUCCESSOR |
| 2 | Symbol | 10 |

The table of the type of nodal points in this example is describing two different types of nodal points: The invisible root of the tree and the nodal point of the employee. To the rules among others belong the name of the table from which the successors in the tree should be interrogated, the condition which is to be used during the interrogation, the field name according to which the subordinated nodal points are to be sorted and the type of nodal point which the subordinated nodal points are having.

The table of the properties of the nodal points for each type of nodal point is defining which properties all objects of this type are having. In the example the root does not have any properties, employee nodal points have the properties "ID", "text", "HasSucessor", and "symbol". To the rules of such a nodal point property among others the term is belonging by the means of which the property can be obtained from the database. The algorithm is combining all these text to an interrogation and is loading in this way all objects needed. To open the root of the tree, the following interrogation is generated (in the example in SQL-Syntax):

```
SELECT      NAME,
            ID,
            HAS_SUCCESSOR,
            10
FROM        STAFF.V_EMPLOYEE
WHERE       ID_SUPERIOR IS ZERO
``` wherein V_EMPLOYEE is a view, which is finding out whether an employee has a successor or not. This view can be programmed in the following way:

```
CREATE VIEW V_EMPLOYEE AS
SELECT    M.NAME,
          M.ID,
          M.ID_SUPERIOR
          DECODE(COUNT(U.ID), ZERO, 0, 1) HAS_SUCCESSOR
FROM      EMPLOYEE M,
          EMPLOYEE U
WHERE     M.ID = U.ID_SUPERIOR(+)
GROUP     M.NAME,
BY        M.ID,
          M.ID_SUPERIOR
```

To enable the opening of a deliberate employee nodal point of the tree, during the construction the properties of the superior object have to be evaluated. In accordance with the method according to the invention therefore, in the rules stand-in's are used, which during the interpretation are considered as references to the concrete properties of the superior object. Therefore to open an employee nodal point, firstly the following interrogation is generated:

```
SELECT    NAME, ID, HAS_SUCCESSOR, 10
FROM      STAFF.V_EMPLOYEE
WHERE     ID_SUPERIOR = \&%ID\
```

Thereafter all stand-in's are substituted on the basis of the properties of the superior object as for example for the nodal point representing Herr Maier:

```
SELECT    NAME, ID, HAS_SUCCESSOR, 10
FROM      STAFF.V_EMPLOYEE
WHERE     ID_SUPERIOR = 7
```

The list forming thereby now in the tree structure of the explorer is shown. Each nodal point as an incription is getting the contents of the property "text" i.e. the name of the employee. Whether in front of the name a switch area to open is shown or not is depending from the contents of the property "HasSuccessor". The symbol used for the display is obtained from the property "symbol", which in the example is the same for all nodal points.

The concept to assemble database commands from rules while substituting stand-in's by properties of superior display elements to construct new display elements is the central constituent of the method according to the invention. In the example on the basis of control tables for list structures and explorers (see above) and the table of the description of columns, the list of the tasks of an employee can be generated as soon as the user is clicking on an employee nodal point.

Table of the Column Description:

| ID_LIST | ID | DESIGNATION | FIELD NAME | WIDTH |
|---------|----|-------------|------------|-------|
| 1 | 1 | ID | ID | 150 |
| 1 | 2 | task | DESIGNATION | 400 |

The database command which can be generated for the list from the rules is reading:

SELECT ID, DESIGNATION, ID_EMPLOYEE

FROM STAFF.TASKS

ORDER BY DESIGNATION

The entry in the Explorer table is supplementing this command by a condition:

SELECT ID, DESIGNATION, ID_EMPLOYEE

FROM STAFF.TASKS

WHERE ID_EMPLOYEE=\% ID %\

ORDER BY DESIGNATION

The stand-in now is substituted by the concrete property "ID" of the display element (the clicked nodal point) superior to the list structure such, that only the tasks of this particular employee are loaded into the list structure.

According to the same method now all other display elements of a program surface currently running can be found (program frame, command menus, dialog boxes, dialog fields, switch areas, charts . . . ). To this end it is sufficient to define corresponding control tables and to generate and algorithm which is interpreting the contents thereof and the properties of the superior object in such a way, that the desired display elements are formed.

To enable actions on the basis of user inputs further the rules have to define how the database commands are assembled on the basis of such inputs to offer the desired functionality. To this end, the explorer of the example could have three switch areas "new", "change" and "cancel" by the means of which the user can modify the data in the table "TASKS". The algorithm should in the case the user is overwriting the designation of a task and is activating the switch area "change" from the rules defined above, assemble the following database command:

```
UPDATE      STAFF.TASKS
SET DESIGNATION = '\%text%\'
WHERE       ID = \%ID%\
```

Before the execution then the stand-in's of the command are substituted by the properties of the entry in the list to which the command is referring.

Apart from the elementary commands for data manipulation (INSERT, UPDATE, DELETE) more complex functions can be called, which as parameters are processing existing objects or properties of objects.

Such a stored procedure "CALCULATE_COSTS" could wait for an employee entry from the tree structure as a parameter. Whenever the user is clicking an employee nodal point and is choosing from the command menu (loaded on the basis of rules, too) the provided command, the algorithm firstly would provide the parameters—i.e. the reference to the list containing the entry—and the current number of the nodal point within said list and thereafter would pass the command CALCULATE_COSTS(reflist, nEntry), to the database.

Figure 1:
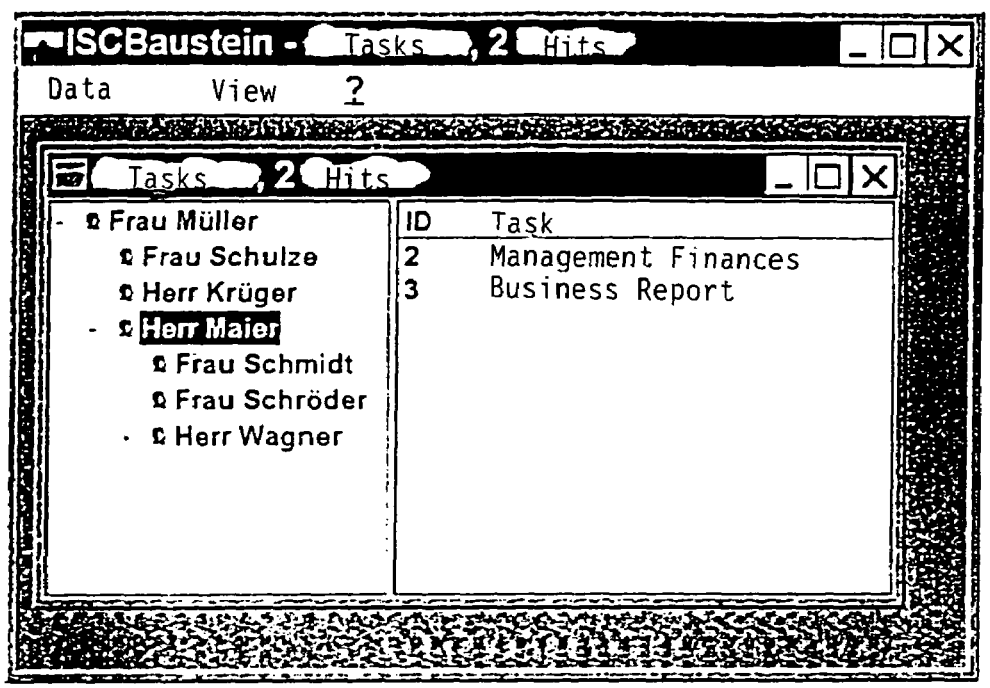
Figure 2:
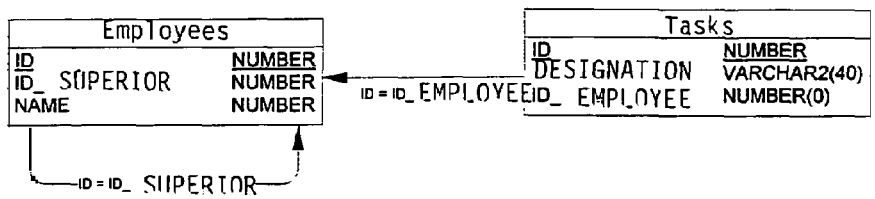
FIG. 2 is showing the data model of the data, which the "Explorer" described above should process. It is representative for usual relational database far more complex in companies in which the business data are stored and processed.
Figure 3:
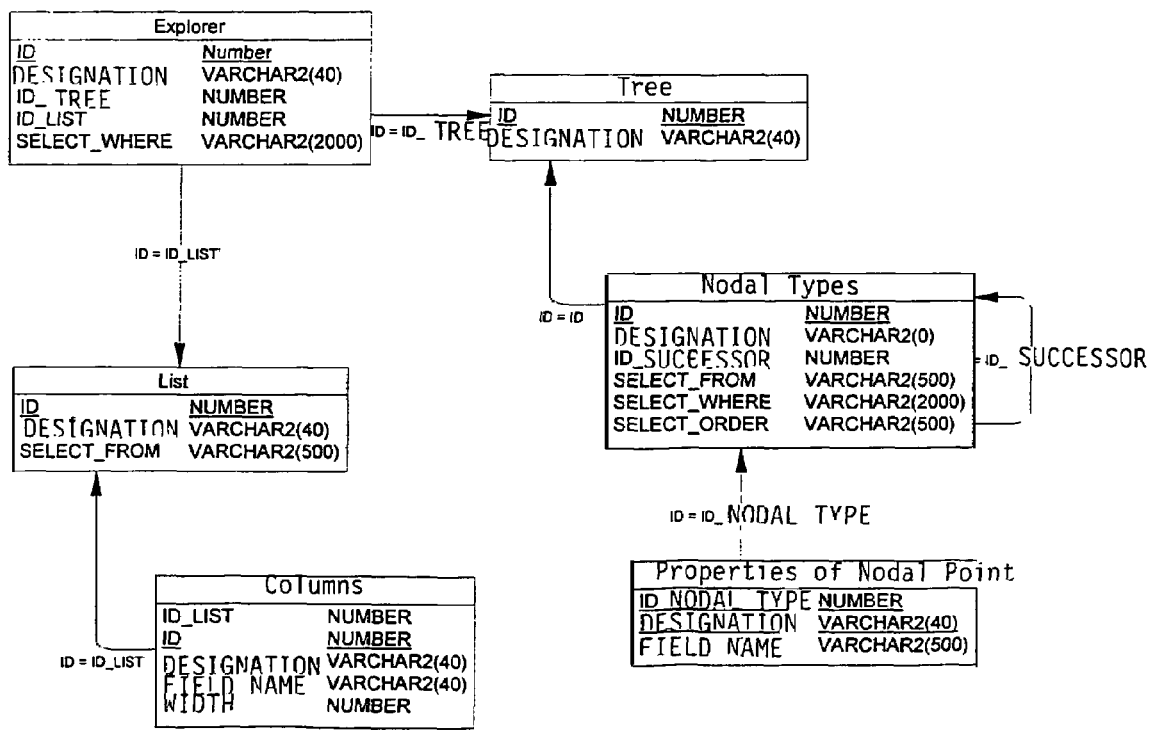
FIG. 3 is showing the data model of the structure of rules as this, too, is described in the enclosed claim 2, wherein here the structure of rules used in the example described above is shown. In practical application far more complex structures of rules are used to support correspondingly complex program surfaces.

FIG. 4 is showing the state of the program of the Graphical User Surface of FIG. 1. The solid arrows are corresponding the hierarchy according to feature b of claim 1, the dashed arrow is representing the relation according feature c of claim 1. For better understanding in FIG. 4 above each list the database interrogations are shown by the means of which the lists according to claim 2 can be constructed using the substitution of stand-in's.

The inventive step of the present invention followingly has to be seen in the combination of a number of technics, namely the storing of rules in a relational database model dynamic generation of database commands substituting stand-in's in database commands linking of display elements with fields of tables in a database management of a hierarchy of lists as a representation of the state of the program These features according to the invention are connected with a suitable structure of rules. In this way the description of a graphical user interface and its relation to the data managed and its function exclusively is possible by entries in tables. The rules so to say can be seen as a "formal specification" which during the running time are interpreted by the generally valid algorithm which is generating the respective state of the program only by executing assembled database enquiries. It has to be especially referred to the fact, that the database enquiries according to the invention are making access to data of rules as well as to the data to be processed and are linking the same in a suitable form.

The structure of rules used and the respective implementing of the generally valid algorithm together are defining the class of all graphical user interfaces which in the respective exemplary embodiment can be specified by rules. Such for the example described above, the structure of rules chosen is relatively small, it is allowing, however, the creation of deliberate explorers as long as these in the left part are consisting of a tree and in the right part are consisting of a depending list. More complex structures of rules allow correspondingly more complex Graphical User Interfaces. For commercial use of the invention therefore for example a structure of rules could be created in which dialog boxes, combo boxes, command menus etc. could be specified, too.

The advantage of the invention is consisting in the substantial reduction of the expenditure as well as of the technical know how which according to the present state of art are necessary for the generation of a graphical user interface. Additionally the invention is suggesting the implementation of the generally valid algorithm in a multi layer architecture (for example in "Client Server" or "3 Tier" architecture). The respective state of program according to the invention during the running time can be generated on a server and thereafter only has to be transferred to the client and can be displayed there. Thereby in an advantageous way a reduction is obtained of

- the functionality of program needed on the Client to an absolute minimum (Thin Client), which additionally is generally valid and therefore is independent from the respective graphical user surface,
- the necessary data transfer between Client and Server to the data necessary for the display in the graphical user surface.

The invention claimed is:

1. A method for generation of Graphical User Interfaces for computer programs, comprising the steps of:
    a) defining a set of lists representing display elements and contents thereof;
    b) defining a hierarchical order, and associating entries in a list of the set of lists with other lists of the set of lists and such is representing the "being contained" of display elements in one another; and
    c) defining a relationship between the entries in the lists of the set of lists which is defining which particular display element depends on the contents of which other superior display element so that a Graphical User Interface is generated;
    automatically generating any current program state of said Graphical User Interface at runtime on the basis of rules stored in a database, said rules including syntactical components which specify how to compose database queries, said database queries being dynamically built;
    wherein said rules generating said program state of said Graphical User Interface include an algorithm module responsible for building structure and contents of the set of lists for said Graphical User Interface for each program state exclusively by said database queries, which access the rule data as well as the data to be processed, wherein a syntactical composition of said database queries is done on the basis of said rules;
    maintaining the hierarchical order between the lists of the set of lists,
    using, during syntactical composition of said database queries, the relationship between the entries in the lists of the set of lists to substitute placeholders in the database queries by contents of the superior display element.

2. The method according to claim 1, wherein the algorithm module is changing the program state on the basis of user inputs in such a way as this is provided by the structure formed by the rules and the contents of the rules as well by its own implementation.

* * * * *